(12) United States Patent
Ohno (10) Patent No.: US 6,249,276 B1
(45) Date of Patent: Jun. 19, 2001

(54) PEN-INPUTTED PERSONAL INFORMATION TERMINAL DEVICE (75) Inventor: Hiroyuki Ohno, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 08/917,736

(22) Filed: Aug. 27, 1997

(30) Foreign Application Priority Data

Jan. 22, 1997 (JP) ...................................... 9-009527

(51) Int. Cl.[7] ....................................................... G09G 5/00
(52) U.S. Cl. ............................................. 345/173; 345/179
(58) Field of Search ..................................... 345/173, 179, 345/180; 178/18

(56) References Cited

U.S. PATENT DOCUMENTS

| | | | | |
|---|---|---|---|---|
| 5,401,917 | * | 3/1995 | Yoshida et al. | 345/179 |
| 5,453,762 | * | 9/1995 | Ito et al. | 345/179 |
| 5,612,720 | * | 3/1997 | Ito et al. | 345/211 |

FOREIGN PATENT DOCUMENTS

| | | |
|---|---|---|
| 6332861 | 12/1994 | (JP). |
| 7129512 | 5/1995 | (JP). |

* cited by examiner

Primary Examiner—Matthew Luu
(74) Attorney, Agent, or Firm—Rothwell, Figg, Ernst & Manbeck (57) ABSTRACT A pen-inputted personal information terminal device comprises a dedicated pen incorporating therein an ID code transmitting section for transmitting a specific ID code. When the dedicated pen is accommodated in a pen accommodating section of the main system of the terminal, an ID receiving section receives ID code from the dedicated pen, and a control section authorizes the input, if it is determined that the received ID code matches an ID code stored in a storage section, from a tablet with any other pen. When input from the tablet is executed with the dedicated pen even if the dedicated pen is not accommodated in the pen accommodating section of the main system thereof, the control section determines the ID code, and authorizes the input from the tablet if the inputted ID code matches the previously stored ID code.

8 Claims, 9 Drawing Sheets

| PEN No. | EXAMPLE OF ID CODE | VALUE OF AUTHORIZATION FLAG | STATE OF AUTHORIZATION |
|---|---|---|---|
| 1 | 1010100010011100000 11001011011110 | 1 | ○ (SET) <br><br> SUPERIOR SOFTWARE REFERS TO FLAG AND IDENTIFIES PEN |
| 2 | 1010011000001110010 00101010111101 | 2 | |
| 3 | 1010111000100000110 11001111010010 | 3 | |
| 4 | 0111100110110000010 00111010101001 | 4 | |
| OTHER | | 0 | (RESET) |

PEN-INPUTTED PERSONAL INFORMATION TERMINAL DEVICE

FIELD OF THE INVENTION

The present invention relates to security technology for personal information equipment in which operation and input are performed with a pen.

BACKGROUND OF THE INVENTION

There is disclosed a method of authorizing an individual in information equipment as security technology for a personal communicating device based on the conventional technology, for instance, in Japanese Patent Laid-Open Publication No. HEI 7-129512 as well as in Japanese Patent Laid-Open Publication No. HEI 6-332861.

Figure 10:
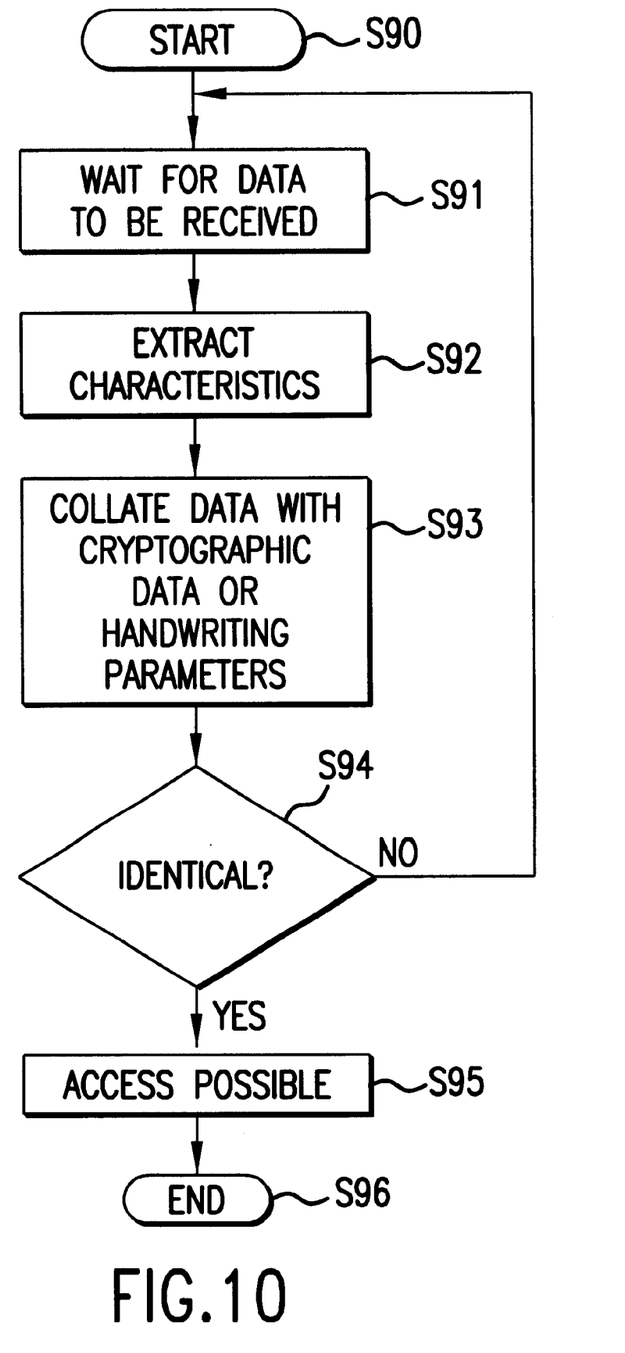
FIG. 10 is a flow chart showing a method of authorizing an individual in the information equipment based on the conventional technology.

FIG. 10 shows the method of authorizing an individual in information equipment disclosed in these publications.

In the authorizing method disclosed in the example, security management for controlling access to information in the information equipment is carried out by correlating data of inputted graphics and characters or the like or handwriting with authorization data or characteristics parameters previously stored therein.

Namely, in these types of information equipment, security control is provided by, at first, receiving data in step 91, extracting the characteristics in step 92, correlating the characteristics with cryptographic data or measuring a degree of similarity between the characteristics and the handwriting parameters or the like in step 93, and further making a determination in the next step 94 as to whether each of the data is identical to the authorization or not, and releasing the access lockout and permitting access to information stored in the terminal in the next step 95 in a case where it is determined that a result of correlation is "yes".

In this case, the data inputted in step 91 is necessary to be data for particular graphics or handwriting, and further the user is required to have the cryptographic symbol or characteristics data for the handwriting stored in the main system of the terminal. For instance, in the invention on the conventional technology and disclosed in Japanese Patent Laid-Open Publication No. HEI 7-129512, it is required to write a cryptographic symbol in the terminal once, while, in the prior invention disclosed in Japanese Patent Laid-Open Publication No. HEI 6-332861, it is necessary to input characters or the like in the terminal once to authorize the handwriting, so that the inventions can not be applied, for instance, to a case where the user wants to move or open a window in a window system at the beginning of the operation. For this reason, if the inventions are applied to equipment having a user interface with large flexibility like a pen-inputted personal information terminal device, a free session may be impeded. Also, in the operation for releasing the protection described above, completely identical data is not always inputted, so that inaccuracy is inevitably left in the determination for authorizing the cryptographic symbol or handwriting.

However, in the conventional technology as described above, a method of effecting the protected state is not disclosed, and if the protection is once released, protection-released state is continued until an operation for effecting the protected state is executed again, so that, if the user forgets activate the protected state after a session to the main system of the terminal is once finished, there is the danger that anyone can access the information, and for this reason, in a case where the method for authorizing an individual as described above is applied to the pen-inputted personal information terminal device, the information may be abused.

Also, if requirements of writing graphics and characters at the beginning of the operation whenever the user uses the main system of the terminal or of setting protection each time the user leaves the terminal are added to the operation, the user can not smoothly operate the terminal, which causes a free session impeded.

SUMMARY OF THE INVENTION

It is an object of the present invention to provide a pen-inputted personal information terminal device in which if the user owns a pen with a specific ID code, a security function can be included in such actions as owning the pen and touching a tablet with the pen, so that the user is not required to release the protection before starting use of the equipment, nor to carry out an operation for effecting the protection after use thereof, which makes it possible to solve the problems on security caused by forgetting to execute an operation for effecting the protection, and at the same time to freely operate the terminal as usual without realizing the necessity for security.

In the present invention, the pen-inputted personal information terminal device comprises a dedicated pen for transmitting thereto its preset ID code, on the other hand, the main system of the terminal stores therein the ID code of the dedicated pen, receives the ID code transmitted by the dedicated pen, and authorizes pen-touched input of various instructions for processing onto the tablet in a case where the received ID code matches the previously stored ID code of the dedicated pen, so that it is possible to prevent any unauthorized user from abusing the pen-inputted personal information terminal device even if the user does not carry out any specific operation so long as the user carries the dedicated pen with the ID code specific to the terminal with the user, and the user can operate the device without realizing the necessity of security because the user is not required to do any specific operation for authorization.

In the present invention, the pen-inputted personal information terminal device further comprises a pen accommodating section for accommodating therein a pen in the main system of the terminal, tries receiving an ID code of a pen from the pen when the pen is accommodated in the pen accommodating section, receives the ID code transmitted from a dedicated pen in a case where it is determined that the pen is the dedicated pen, makes determination as to whether the ID code from the pen can be received or not .when the pen is accommodated in the pen accommodating section, and also further makes determination, in a case where the ID code can be received from the pen, as to whether the received ID code matches the ID code of the previously stored dedicated pen or not, and authorizes pen-touched input of various instructions for processing onto the tablet in a case where the received ID code matches the ID code of the previously stored dedicated pen, so that, so long as the dedicated pen with the ID code specific to the terminal is accommodated in the pen accommodating section, operation with any other pen can always be valid, which makes it possible to improve convenience in use, and if the dedicated pen to the terminal is not accommodated in the pen accommodating section, input with any other pen other than the dedicated pen becomes basically invalid, so that the user can insure security without carrying out any specific operation and also it is possible for any unauthorized user from abusing the pen-inputted personal information terminal device.

In the present invention, the pen-inputted personal information terminal device makes determination, in a case where any of various instructions for processing is inputted by touching the tablet with the pen, as to whether the input is carried out with operation of pen-down or of pen-drag, makes determination, in a case where it is determined that the input is performed with the pen-down, as to whether an ID code can be received from the pen or not, further makes determination, in a case where the ID code could be received from the pen, as to whether the received ID code matches the previously stored ID code of the dedicated pen or not, and authorizes pen-touched input of various instructions for processing onto the tablet in a case where the received ID code matches the previously stored ID code of the dedicated pen, so that, even in a case where the dedicated pen is not accommodated in the pen accommodating section, the input can be performed in a case where pen-input on the tablet is performed with the dedicated pen to the terminal, and for this reason, the user can insure security without carrying out any specific operation and also it is possible for any unauthorized user from abusing the pen-inputted personal information terminal device.

In the present invention, the pen-inputted personal information terminal device makes determination as to whether an ID code can be received from the pen at each prespecified time interval or not, further makes determination, in a case where the ID code could be received from the pen, as to whether the received ID code matches the previously stored ID code of the dedicated pen or not, and authorizes pen-touched input of various instructions for processing onto the tablet in a case where the received ID code matches the previously stored ID code of the dedicated pen. For this reason, the user can automatically carry out authorization of an ID code at each prespecified time interval without any particular operation executed by the user, further can insure the security thereof, and it is possible for any unauthorized user from abusing the pen-inputted personal information terminal device.

In the present invention, the pen-inputted personal information terminal device has a plurality pieces of dedicated pen provided therein and different ID codes are set thereto respectively, on the other hand, it previously stores the ID codes of the plurality pieces of dedicated pen, and authorizes pen-touched input of various instructions for processing onto the tablet in a case where the received ID code matches one of the previously stored ID codes of the plurality pieces of dedicated pen, so that, in a case where a plurality of users use one unit of information terminal, security for communications and information can be shared by the users without impeding any free session to the terminal.

Other objects and features of this invention will become understood from the following description with reference to the accompanying drawings.

DESCRIPTION OF THE PREFERRED EMBODIMENTS

Figure 1:
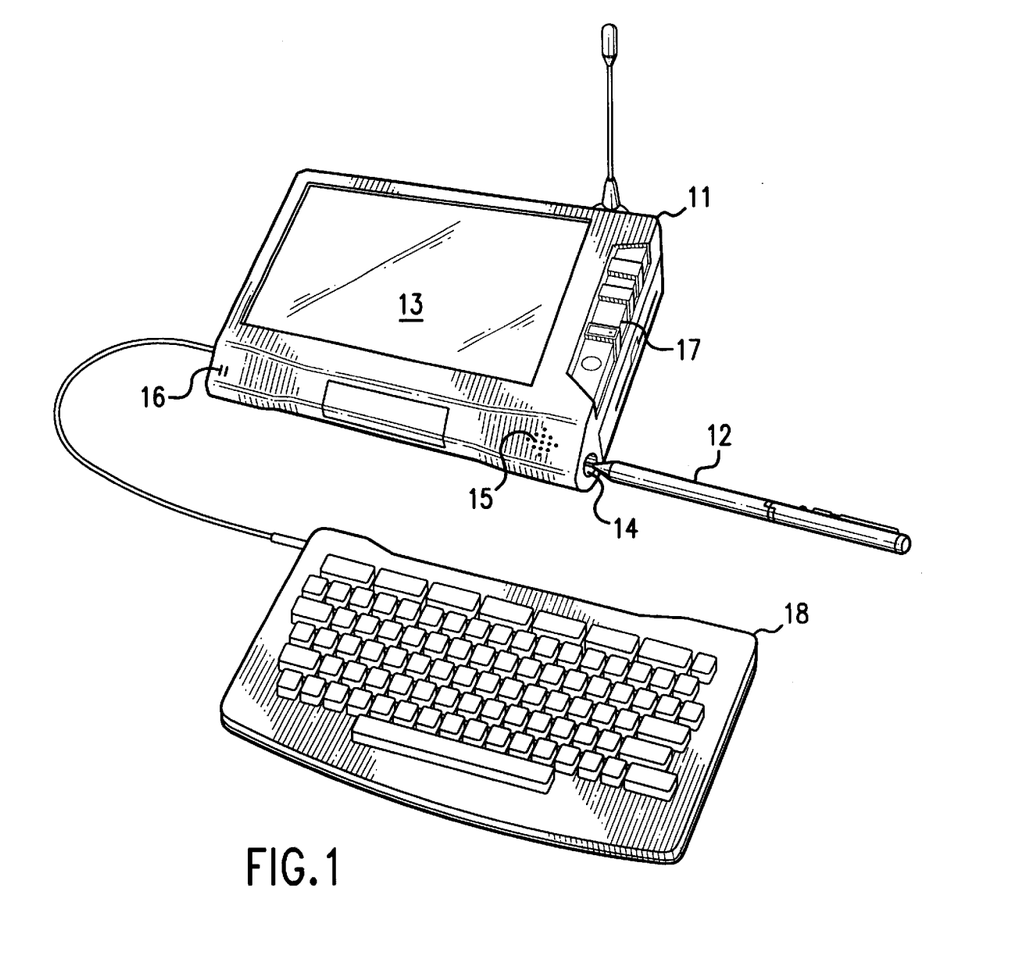
FIG. 1 is a view showing appearance of a pen-inputted personal information terminal device according to Embodiment 1 of the present invention.

FIG. 1 shows a view showing appearance of the pen-inputted personal information terminal device according to Embodiment 1 of the present invention.

In the figure, the pen-inputted personal information terminal device according to Embodiment 1 is a so called a PDA (Personal Digital Assistant) incorporating therein a radio section, which can exchange packet data with a superior station and incorporates therein a function for voice communications, or Mailer/Web-browser or the like for electronic mails as applications. More specifically, the main system 11 of the terminal has a microphone 16 and a speaker 15 for voice communications provided therein and at the same time incorporates therein a call button 17 for calling a portable telephone terminal which is a unit separately provided from the main system 11 of the terminal such as a so called a pager unit or the like, and a pen accommodating section 14 for accommodating therein a pen such as a dedicated pen 12 specific to the terminal or the like. The main system 11 thereof also has an LCD-integrated type tablet 13 provided thereon so that the user carries out various types of operation by inputting therein various instructions for processing with characters or commands inputted therein by touching the LCD-integrated type tablet 13 with the dedicated pen 12 or any other pen to input data thereto or output data therefrom. It should be noted that the reference numeral 18 is a keyboard discretely provided from the terminal device because the keyboard is not always necessary for the terminal device.

Figure 2:
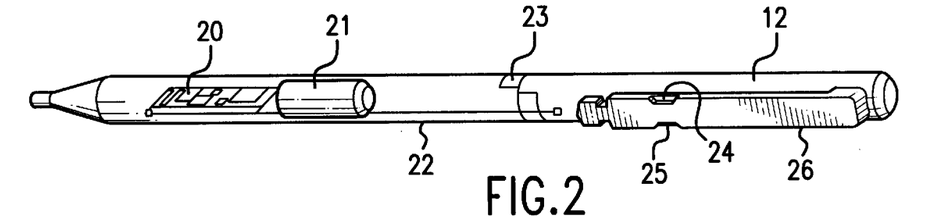
FIG. 2 is a view showing configuration of a pen used for the pen-inputted personal information terminal device according to Embodiment 1 of the present invention.

FIG. 2 shows configuration of the dedicated pen 12. The dedicated pen 12 has a secondary battery 21, an ID code transmitting section 20, and an antenna 22 incorporated therein. The pen 12 has the configuration in which a power supply to the ID code transmitting section 20 can be turned ON/OFF with a rotary switch 23 when it is not used. Further, a clip section 26 is used when the pen is snapped into the pen accommodating section 14 shown in FIG. 1 on accommodating the pen, and the clip section 26 has contact points 24, 25 for charging the secondary battery 21.

Figure 3A:
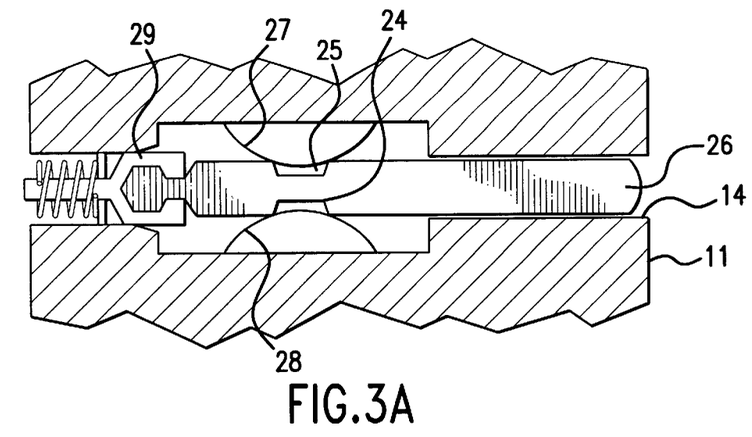
FIGS. 3A and 3B are views showing internal configuration of a pen accommodating section used for the pen-inputted personal information terminal device according to Embodiment 1 of the present invention.
Figure 3B:
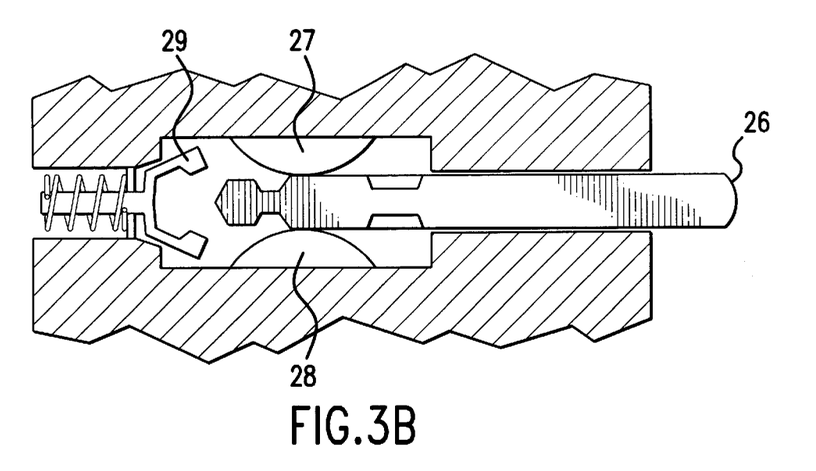

FIGS. 3A and 3B show internal configuration of the pen accommodating section 14 as well as a state where the dedicated pen 12 is accommodated therein. In the figure, the pen accommodating section 14 with the clip section 26 of the dedicated pen 12 accommodated therein comprises a catcher 29 for fixing the dedicated pen 12, and contact points 27, 28 in the main system side for contacting the contact points 24, 25 for charging the dedicated pen 12 respectively. As shown in FIG. 3A, when the dedicated pen 12 has completely been accommodated in the pen accommodating section 14, the catcher 29 is fixed at a position where the clip section 26 is caught, and at the same time the contact points 24, 25 for charging are set in an energized state with the contact points 27, 28 in the main system side respectively. When the accommodated dedicated pen 12 is to be taken out, when the user pushes the accommodated dedicated pen 12 in the inside direction once, namely in the left direction of the figure, the catcher 29 releases the dedicated pen 12 as shown in FIG. 3B, so that the dedicated pen 12 will pop-up from the pen accommodating section 14.

Figure 4:
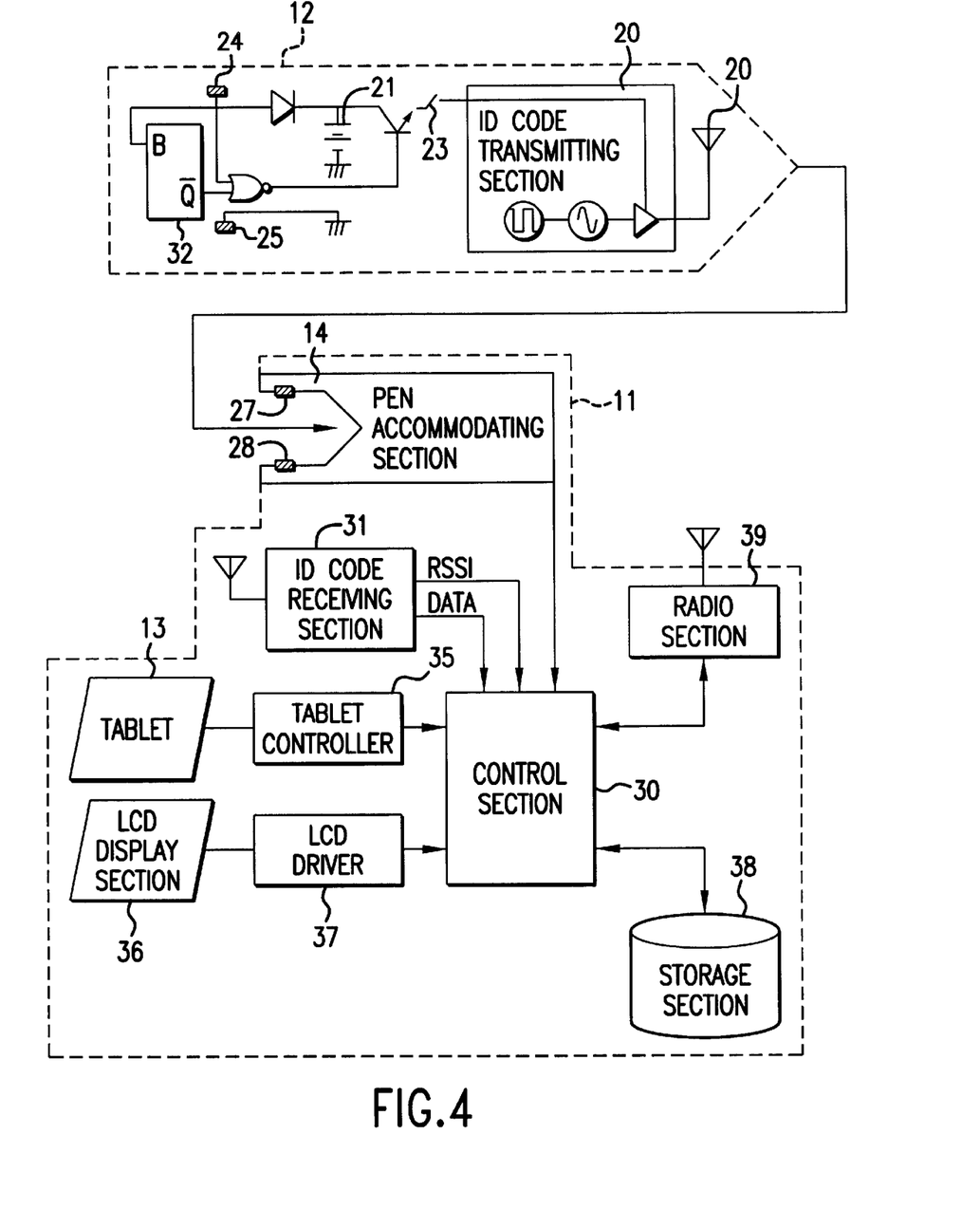
FIG. 4 is a block diagram showing system configuration of a dedicated pen and the main system of the pen-inputted personal information terminal device according to Embodiment 1 of the present invention.

FIG. 4 shows in detail system configuration of the main system 11 of the terminal and the dedicated pen 12 constituting the pen-inputted personal information terminal device according to Embodiment 1 of the present invention. The pen-inputted personal information terminal device according to Embodiment 1 incorporates therein the radio section as described above so that the terminal can execute voice communications and data communications with a superior station and can input/edit personal data as well as other information to be stored therein. Namely, in the figure, the reference numeral 36 indicates an LCD display section for displaying information from the control section 30, and the reference numeral 37 indicates an LCD driver. The reference numeral 13 indicates a transparent tablet employing a resistance film type of input system provided on the LCD display section 36 and is built so that, in a case where a pen such as the dedicated pen 12 or the like touches the tablet 13, a signal corresponding to the touched coordinate can be inputted to the main system 11 of the terminal.

Also, designated at the reference numeral 35 is a tablet controller for converting the position of the tablet 13 pressed with the tip of the pen to coordinate information and sending it to the control section 30, at 39 a radio section for executing voice communications and data communications, and at 38 a storage section for storing therein ID codes for dedicated pens 12, personal data, data for communications, or application software programs or the like and has the configuration in which demodulated data and RSSI (Radio Signal Strength Indication) are sent to the control section 30. The control section 30 operates with the event-driven type of software described later and has the configuration in which the control section will operate upon receipt of an interrupt from the tablet controller 35 or pen accommodating section 4 or the like.

The reference numeral 20 indicates the ID code transmitting section incorporated in the dedicated pen 12 and has the configuration in which an ID code specific to the dedicated pen 12 is preset therein or will be generated, is FSK-modulated and amplified when driven by a VCO, and then is transmitted through radio by the antenna 22. Inserted into the pen accommodating section 14 is a pen such as the dedicated pen 12 or the like, and the catcher 29 detects the fact that the pen has been accommodated and fixed at a prespecified position thereof, and issues an interrupt signal to the control section 30 when the pen such as the dedicated pen 12 or the like is accommodated therein and taken out therefrom. Further, when the power switch 23 of the dedicated pen 12 is ON, the dedicated pen 12 is fixed in the pen accommodating section 14, the contact points 24, 25 in the pen side are conductive through the contact points 27, 28 in the main system side of the terminal, a power voltage is supplied to the contact point 24 and a ground voltage is supplied to the contact point 25 from the main system. It should be noted that power is supplied to the ID code transmitting section 20 by a monostable multivibrator 32 for a while, after accommodation of the dedicated pen 12 in the pen accommodating section 14, to be used for transmitting an ID code, and after the step the operation is switched to only charging for the secondary battery 21.

Herein, ID code transaction by the ID code transmitting section 20 has only to be executed within an extremely narrow range, and is executed by a modulated wave of an extremely low power radio, so that the ID code transmitting section 20 and an ID receiving section 31 do not consume a large quantity of power. An ID code length is always transmitted with some words subjected to FSK modulation. So, the dedicated pen 12 transmits, in a case where the rotary switch 23 is ON, an ID code with a supply current from the main system 11 of the terminal as described above for a while after the pen is accommodated in the pen accommodating section 14, but in other cases, the ID code is transmitted with a supply current from the incorporated secondary battery 21. Namely, the dedicated pen 12 has the configuration in which, if the power is turned ON upon turn ON of the rotary switch 23, the ID code transmitting section 20 therein will transmit an ID code at any time.

Figure 5:
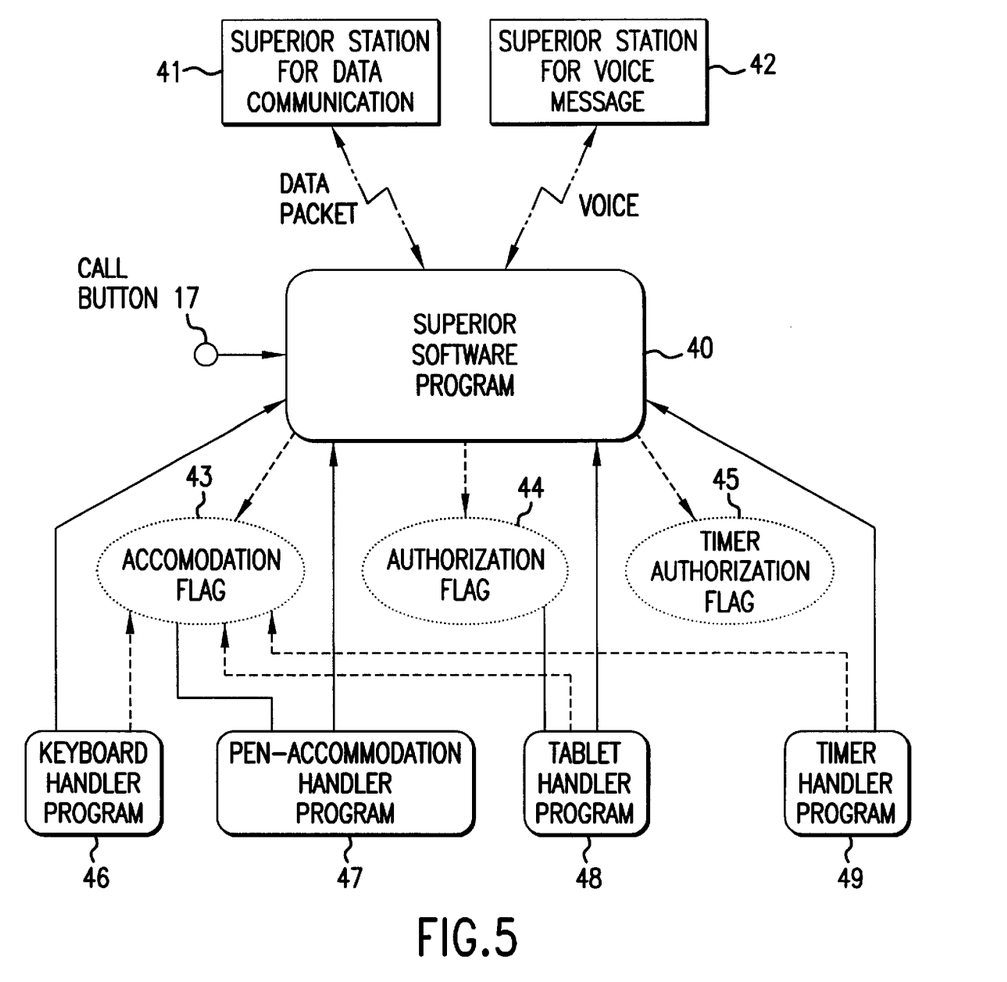
FIG. 5 is a block diagram showing a software program of the pen-inputted personal information terminal device according to Embodiment 1 of the present invention.

FIG. 5 shows configuration of an application software program or the like previously stored in the storage section 38 in the main system 11 of the terminal of the pen-inputted personal information terminal device according to Embodiment 1 and executed by the control section 30 to carry out various types of processing. It should be noted that the figure shows only a section relating to control for restricting operations for security, so that controls of applications and protocol stacks—voice messages for data communications or the like are included in a superior software program 40. The superior software program 40 is programmed so that data or voices can be exchanged between the terminal and the superior station 41 for data communications as well as the superior station 42 for voice messages when the superior software program 40 is executed by the control unit 30.

There are three types of flag for security management; an accommodation flag 43, an authorization flag 44, and a timer authorization flag 45, and each of the flags can be referred to or changed from a pen-accommodation handler program 47, a tablet handler program 48, and a timer handler program 49 respectively. For instance, the accommodation flag 43 is referred to also from a keyboard handler program 46, and each of the flags can be referred to also from the higher software program 40 or other handler programs. It should be noted that, although the timer handler program 49 is not required in this embodiment 1 and is required only in the next embodiment 2, the timer handler program 49 is also shown in FIG. 5 together with the other programs for the sake of convenience.

Next description is made for security operations according to Embodiment 1 with reference to the related drawings.

At first, description is made for the security operations in a case where the dedicated pen 12 is accommodated in the main system 11 of the terminal and in a case where it is not accommodated therein.

Figure 6:
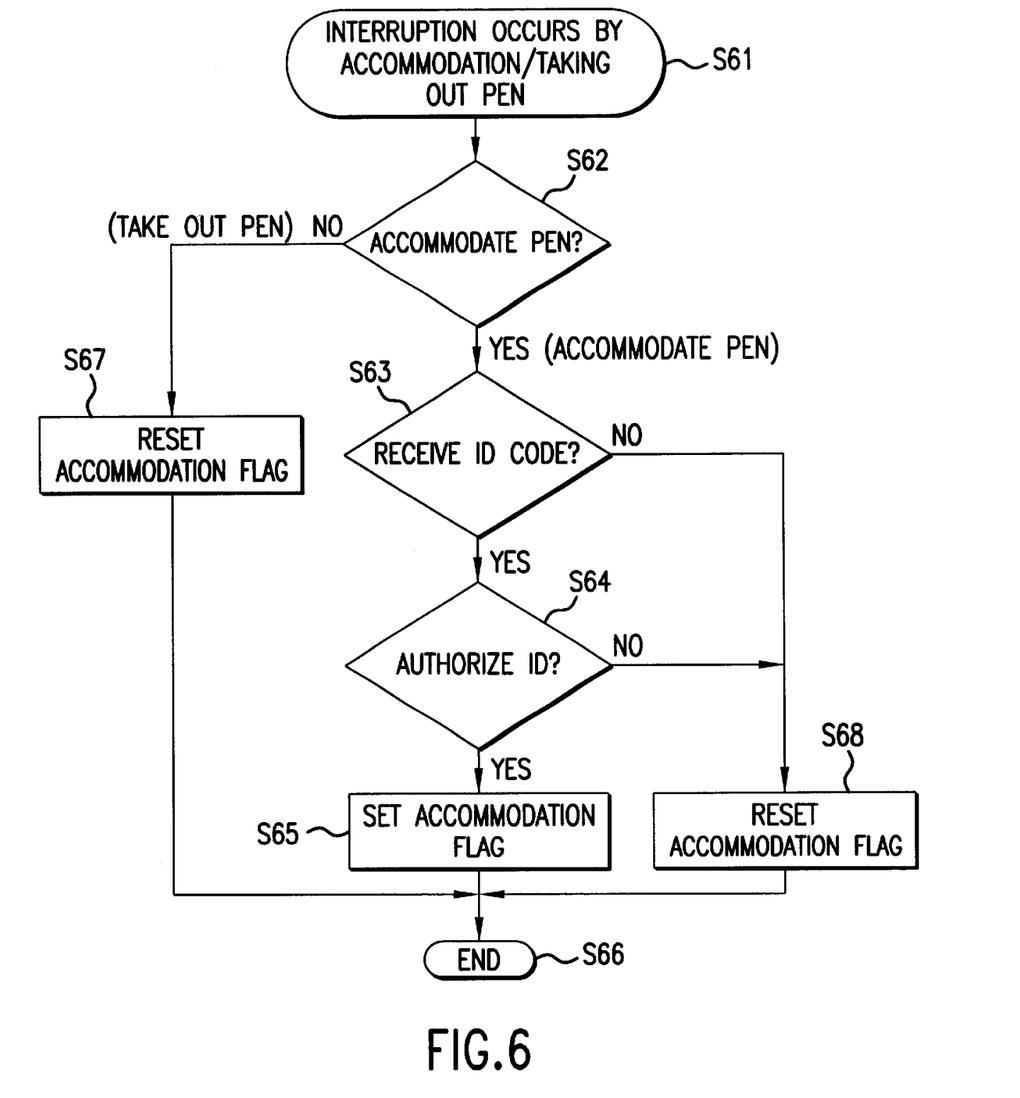
FIG. 6 is a flow chart showing a sequence of processing for a pen-accommodating handler program of the pen-inputted personal information terminal device according to Embodiment 1 of the present invention.

FIG. 6 shows a sequence of security processing in a flow chart in a case where the control section 30 carries out the pen-accommodation handler program 47.

When the catcher 29 outputs an interrupt signal at a point of time when a pen is accommodated in or taken out from the pen accommodating section 14, at first, the interrupt signal is inputted in a first step 61 into the control section 30, and the control section 30 makes determination in step 62 as to whether the pen should be accommodated into or taken out from the pen accommodating section 14.

Herein, in a case where it is determined in the control section 30 that the pen should be accommodated into the pen accommodating section 14 (step 62 "YES"), system control shifts to the next step 63, determination is made as to whether the ID code receiving section 31 can receive the ID code or not when the pen is accommodated therein, and in a case where it is determined that the ID code receiving section 31 could receive the ID code (step 63 "YES"), system control shifts to step 64, the control section 30 further makes determination as to whether the ID code can be authorized or not, namely whether the ID code received by the ID code receiving section 31 collates with the ID code of the dedicated pen 12 specific to the terminal previously stored in the storage section 38 or not. It should be noted that the ID code transmitting section 20 of the dedicated pen 12 transmits an ID code through radio at any time in a case where the rotary switch 23 is ON, and if the dedicated pen 12 to the terminal 11 is accommodated in the pen accommodating section 14, the ID code receiving section 31 can receive the ID code of the dedicated pen 12 through radio because the pen accommodating section 14 is located close to the ID code receiving section 31 as shown in FIG. 4, then the ID code is authorized by the control section 30.

Then, in a case where it is determined by the control section 30 through the processing in step 64 that the ID code can be authorized, namely the ID code received by the ID code receiving section 31 matches the ID code of the dedicated pen 12 previously stored in the storage section 38 (step 64 "YES"), the control section 30 sets the accommodation flag 43 for authorizing input of various instructions for processing executed by touching the surface of the tablet 13 with the pen in step 65. Namely, the accommodation flag 43 is not set until the dedicated pen 12 belonging to the main system 11 of the terminal is physically accommodated in the pen accommodating section 14, the dedicated pen 12 accommodated therein owns the ID specific to the terminal and also the ID is authorized.

In contrast, even in a case where it is determined that the pen has been accommodated in the pen accommodating section 14 (step 62 "YES"), system control shifts to step 68, and the control section 30 resets the accommodation flag 43 therein to prohibit pen-touch input of various instructions for processing onto the tablet 13, in a case where an ID code can not be received from the accommodated pen because the accommodated pen is not the dedicated pen 12 (step 63 "NO") and in a case where, though an ID code can be received from the accommodated pen, the received ID code is not for the dedicated pen 12 to the terminal and the ID code of the accommodated pen can not be authorized, namely the ID code of the accommodated pen does not match the ID code specific to the terminal previously stored in the storage section 38 (step 63 "YES", step 64 "NO").

Also in a case where it is determined that the dedicated pen 12 has been taken out from the pen accommodating section 14 (step 62 "NO"), the accommodation flag 43 is reset in the next step 67. The value for the accommodation flag 43 is always stored in the storage section 38 and the value can be referred to even by other handler program or the superior software program. The call button 17 is programmed so that it is disabled if the accommodation flag 43 is not set.

Figure 7:
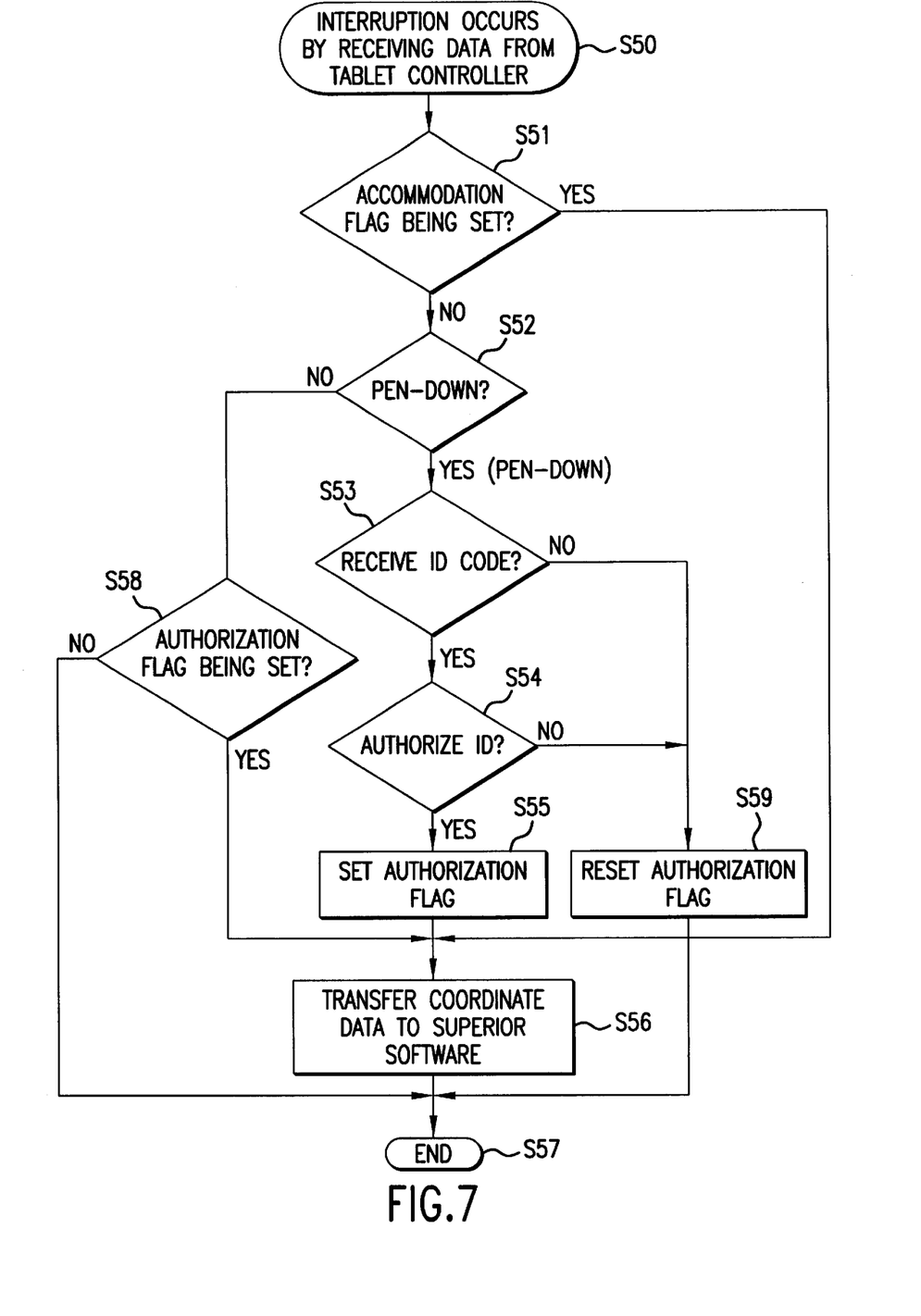
FIG. 7 is a flow chart showing a sequence of processing for a tablet handler program of the pen-inputted personal information terminal device according to Embodiment 1 of the present invention.

FIG. 7 shows in a form of flow chart a sequence of security processing according to the tablet handler program 48 executed by the control section 30 when various instructions for processing are inputted with the pen touching the tablet 13.

At first, to input data therein, when a user touches the tablet 13 with a tip of the dedicated pen 12 or of any other pen, the tablet controller 35 converts the position pressed by the tip of the pen on the tablet 13 to coordinate information to be sent out to the control section 30, so that the control section 30 recognizes the coordinate information as an interrupt signal for event input, starts execution of the tablet handler program 48, and first receives coordinate data from the tablet controller 35 in step 50.

Then the control section 30 makes determination in the next step 51 as to whether the accommodation flag 43 is set in the storage section 38 or not (step 51), and in a case where it is determined that the accommodation flag 43 has been set (step 51 "YES"), system control shifts to step 56, and the control section 30 transfers the coordinate data received from the tablet 13 to the superior software program 40, so that pen-touched input of various instructions for processing will be acknowledged. It should be noted that the accommodation flag 43 is set, as described above, in a case where the dedicated pen 12 has been accommodated as described above, in the pen accommodating section 14 of the main system 11 of the terminal and the ID code thereof matches the ID code of the dedicated pen 12 to the terminal previously stored in the storage section 38 or the like.

Consequently, in a case where the dedicated pen 12 has been accommodated in the pen accommodating section 14 of the main system 11 of the terminal and the ID code thereof matches the ID code of the dedicated pen 12 to the terminal previously stored in the storage section 38 or the like, the accommodation flag 43 is set and input of the various instructions for processing is authorized, so that the user can input/output data and carry out data processing with the main system 11 of the terminal by inputting various instructions for processing therein according to operations with any other pen on the tablet 13.

Setting of the accommodation flag 43 is also referred to for various types of control such as for allowing use of other pointing device at any time, for always validating input from an external keyboard connected thereto, or for enabling the call button 17.

By the way, in a case where it is determined in step 51 that the accommodation flag 43 has not been set (step 51 "NO"), then the control section 30 makes determination in step 52 as to whether the current input of coordinate data is carried out in response to pen-down or pen-drag. Herein the pen-down indicates a state in which initial coordinate data is sent thereto from the tablet controller 35 at a point of time when a pen or the like touches the tablet 13. On the other hand, the pen-drag indicates a state in which a pen or the like stays on the tablet after the pen-down and the pen is moving keeping contact with the tablet 13.

Then, in a case where it is determined that the input was carried out in response to pen-down (step 52 "YES"), then determination is made in step 53 as to whether the ID code receiving section 31 can receive an ID code from the pen accommodated therein or not, and if it is determined that the section Can receive the ID code from the pen accommodated therein (step 53 "YES"), the control section further makes determination for ID-authorization as to whether the received ID code matches the ID code specific to the main system 11 of the terminal stored in the storage section 38 or not by comparing the received ID code to that specific to the main system 11 of the terminal stored the storage section 38 in step 54.

Herein, in a case where the received ID code matches the specific ID code stored in the storage section 38 and the ID has been authorized (step 54 "YES"), it indicates the fact that the coordinate data has been inputted either with the dedicated pen 12 to the terminal or with any other pen in a state where the dedicated pen 12 is present close to the main system 11 of the terminal, so that system control shifts to step 55, and the control section 30 sets an authorization flag 44 for authorizing pen-touched input of various instructions for processing onto the tablet 13 like that in the accommodation flag 43 as described above, then system control further shifts to step 56, and the control section 30 rearrange the coordinate data inputted from the tablet 13 to transfer it to the superior software program 40 so that the pen-touched input of the various instructions for processing will be authorized, and then execution of the tablet handler program 48 is finished in step 57. It should be noted that the authorization flag 44 is always stored with its values, like the accommodation flag 43, in the storage section 38 or the like.

In contrast, in a case where, although it is determined in step 52 that the input was carried out with pen-down (step 52 "YES"), an ID code could not be received from the pen in a state of pen-down (step 53 "NO"), and in a case where, although the ID code could be received from the pen in a state of pen-down, the pen is not the dedicated pen 12 to the terminal 11 so that an ID code of the pen can not be authorized, namely the ID code of the pen does not match the ID code specific to the terminal previously stored in the storage section 38 (step 53 "YES", step 54 "NO"), system control shifts to step 59 with the authorization flag 44 reset, and then system control does not shift to step 56, namely the control section 30 does not transfer the coordinates to the superior software program 40, prohibits the pen-touched input of various instruction for processing onto the tablet 13 with system control shifting to step 57 to terminate execution of the tablet handler program.

In a case where it is determined in step 52 that the input was executed in response to pen-drag (step 52 "NO"), the control section makes determination in step 58 as to whether the authorization flag 44 has been set or not, and in a case where it is determined that the authorization flag 44 has been set (step 58 "YES"), it indicates a case where the ID code was authorized at the time of pen-down before the operation with the pen-drag was started, which causes the control section to determine that the coordinate data inputted from the tablet 13 is valid, and then system control shifts to step 56 to transfer the coordinates to the superior software program 40 and authorizes pen-touched input of various instructions for processing onto the tablet 13. On the other hand, in a case where it is determined in step 58 that the authorization flag 44 has not been set (step 58 "NO"), it indicates a case where the ID code was not authorized at the time of the pen-down before the operation of pen-drag was started, which causes the control section to determine that the coordinate data inputted from the tablet 13 is invalid, and then system control does not shift to step 56, but shifts to step 57 without the coordinate data being transferred to the superior software program 40 and with prohibiting pen-touched input of various types of instruction for processing on the tablet 13 to terminate execution of the tablet handler program.

For this reason, in a case where the dedicated pen 12 to the terminal has not been accommodated in the pen accommodating section 14, the ID code can be received from the dedicated pen 12 and authorized with the authorization flag 44 set only in a case where pen-input is carried out with the dedicated pen 12 or a case where input is executed with any other pen or the like in the state in which the dedicated pen 12 is present close to the main system 11 of the terminal, which allows input of various instructions for processing to execute input/output of data and data processing using the main system 11 of the terminal.

Accordingly, with the embodiment 1, in the state in which the dedicated pen 12 has physically been accommodated in the pen accommodating section 14 and the ID of the dedicated pen 12 is authorized, the accommodation flag 43 is set, so that the tablet handler program 48 transfers all the coordinate data from the tablet controller 35 to the superior software program 40 as shown in FIG. 7, and in the state in which the accommodation flag 43 is set as described above, various processing can be inputted with any type of pen. It should be noted that power to the ID code transmitting section 20 of the dedicated pen 12 accommodated in the pen accommodating section 14 is supplied from the main system 11 of the terminal for a prespecified period of time from the point of time when the pen has been accommodated, and then the power is cut off, so that the power is supplied thereto only for charging of the secondary battery 21 incorporated in the dedicated pen 12.

However, if the dedicated pen 12 to the terminal has not been accommodated in the pen accommodating section 14, it indicates that the accommodation flag 43 is not set, and for this reason in a case where the ID is not authorized at the time of operation with pen-down as shown in FIG. 7, the data will not be transferred to the superior software program 40 even if the power source of the terminal 11 is ON and coordinate data is received from the tablet 13, so that operations with any other pen other than the dedicated pen 12 to the terminal and operations with a pen in a case other than the case where the dedicated pen 12 to the terminal is present close to the terminal is rejected.

As a result, with Embodiment 1, the operation for ID-authorization is executed without requiring a user to perform any particular security processing each time a pen-inputted operation is to be carried out, and determination is automatically made as to whether the pen-operation is to be regarded as valid or invalid, which makes it possible for a user to operate the device without realizing the necessity of security because the user is not required to release protection before use of the device is started.

If the user does not set the dedicated pen 12 with the ID code specific to the terminal in the pen accommodating section 14 of the main system 11 of the terminal, and carries the dedicated pen 12 with the user and tries not to get the dedicated pen 12 close to a range in which the ID code transmitting section 20 can transmit the ID code to the ID code receiving section 31 of the main system 11 thereof, input of various instruction for processing from the tablet 13 and input/output of data are prohibited so that the data is not transferred to the superior software program 40 even if the power in the main system 11 thereof is ON, and for this reason, the pen-inputted personal information terminal device can be prevented from being abused by any other person other than the authorized user without executing any particular security processing.

Also, if the dedicated pen 12 with the ID code specific to the terminal is accommodated in the pen accommodating section 14 of the main system 11 of the terminal, the accommodation flag 43 is set, whereby operation with any other pen can always be valid, and in addition, using other pointing device can always be authorized, input data from an externally connected keyboard can be made valid at any time, and the protection can be released in a case of calling without executing any particular processing.

For instance, if the Web-browser is operated, radio packet data therein is exchanged with the superior station, but this operation can be performed only when the dedicated pen 12 with the specific ID code is used. For this reason, abuse thereof by other person can be prevented, because packet data is charged according to a volume of used data. Also the call button is not made valid unless the accommodation flag is set, so that voice call, which is charged according to the period of time, can not be established so long as the pen with the specific ID is not accommodated therein. In this case, the dedicated pen 12 plays a roll similar to a portion of functions in conventional types of IC card for security as well as of SIM (Subscriber Identity Module) card. Also, there is a case where it is more efficient to use a mouse or a keyboard connected to the device without using a pen for preparing electronic mail or the like. Input from the keyboard is usually masked as well for security, but accommodation of a pen with a specific ID therein allows also use of the keyboard.

Embodiment 2 is characterized in that, independent from Embodiment 1 or in addition to the configuration and functions according to Embodiment 1 as described above, processing for receiving and authorizing an ID code of the pen is always carried out at a time interval set in a timer (not shown herein). Namely, in a case where configuration of Embodiment 2 is independent from that of Embodiment 1, a work of setting a timer authorization flag for authorizing input of various instructions for processing from the tablet 13 is always performed at a cyclic interruption from the timer, and on the other hand, in a case where configuration as well as functions of Embodiment 2 are added to those of Embodiment 1, interruption from the timer is masked if the accommodation flag 43 is set, namely if the dedicated pen 12 to the terminal is accommodated in the pen accommodating section 14, and the timer issues an interrupt signal to the control section 30 at an appropriate time interval and operates so that the timer handler program 49 is started up, if the accommodation flag 43 is not set. It should be noted that the following description on Embodiment 2 assumes the latter case, namely the case where a function, in which the processing for receiving and authorizing the ID code of the pen is always carried out at a time interval set in the timer, is added to the function of Embodiment 1.

Figure 8:
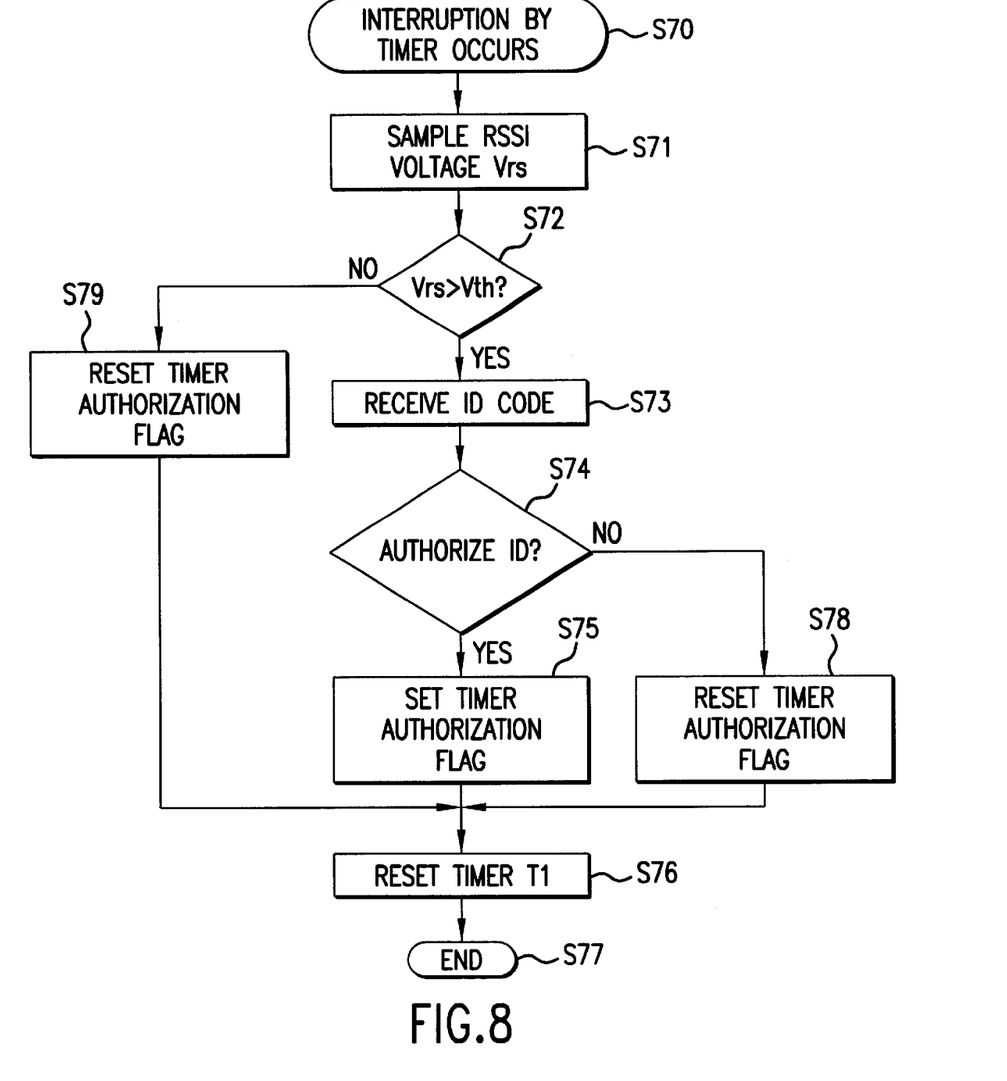
FIG. 8 is a flow chart showing a sequence of processing for a timer handler program of a pen-inputted personal information terminal device according to Embodiment 2 of the present invention.

FIG. 8 shows a flow chart of operations by the timer handler program 49. At first, when interruption by a timer occurs in step 70, an RSSI voltage from the ID code receiving section 31 is sampled in step 71.

The RSSI voltage is a voltage proportional to electric field strength of a received wave from the ID code transmitting section 20 incorporated in the dedicated pen 12, so that it is generally possible to known how far the dedicated pen 12 is away from the main system 11 thereof by measuring the RSSI voltage. To avoid fluctuation of the voltage value, an average RSSI voltage Vrs is obtained by executing the sampling operation several times.

Then in step 72, a preset threshold voltage value Vth is compared to the RSSI voltage Vrs data obtained by executing sampling several times and averaging the sampled data, and in a case where it is determined that the threshold voltage value Vth is larger than the RSSI voltage Vrs (step 72 "NO"), which indicates a case where the dedicated pen 12 is not present adjacent to the main system 11, so that the control section 30 resets the timer authorization flag 45 according to the processing in step 79 with system control shifted to step 76 to reset the timer and terminate the processing.

In contrast, in a case where it is determined that the RSSI voltage Vrs is larger than the threshold voltage value Vth (step 72 "YES"), which indicates a case where the dedicated pen 12 is present adjacent to the main system 11, so that system control shifts to the next step 73 with the ID code received.

Then, in a case where the ID code is received in step 73, further determination for ID-authorization is made in the next step 74 as to whether the received ID matches the specific ID code or not, and in a case where it is determined that the ID code could be authorized (step 74 "YES"), system control shifts to the next step 75 with the timer authorization flag 45 set, and on the other hand, in a case where it is determined that the ID code could not be authorized (step 74 "NO"), system control shifts to the next step 78 with the timer authorization flag 45 reset, and after the step, system control shifts to step 76 in both of the cases.

In step 76, the timer is reset, and execution of the timer handler program is finished in step 77. After the steps, if an interval for an interruption by the timer has passed, the next interruption is generated again, and the same processing as that described above is repeated from step 70.

It should be noted that a threshold voltage value Vth can arbitrarily be set from the superior software program 40 and the timer authorization flag 45 can be referred to also from the superior software program 40 or other handler program. If the superior software program 40 sets a threshold voltage value Vth, it can be estimated whether the pen with the specific ID code is present within a preset distance or not by periodically referring to the timer authorization flag 45.

If the superior software program 40 sets the threshold voltage value Vth to a value corresponding to an appropriate distance d and the timer authorization flag 45 is reset for a while, it is possible to guess that the situation is one of the following three states; namely a state where the pen with a specific ID is away from the main system by a distance d or more, a state where the transmission power is weak due to depletion of the battery, and a state where the user finished use of the main system and cut off the power of the pen. Also, if the timer authorization flag 45 is set, such a state that the user holding the pen with the specific ID code comes up to the device to prepare access can be estimated.

Accordingly, with the Embodiment 2 of the present invention, in a case where the dedicated pen 12 with a specific ID code is present within a distance d arbitrarily set, ID code is automatically checked once for a preset period of time with restrictions concerning operations of the main system 11 of the terminal removed or vice versa, which makes it possible to enhance reliability of security.

So long as only the processing for monitoring the timer handler program 49 as well as the timer authorization flag 45 is effective, the operating state can be controlled according to the authorization described above. Namely, the power source of the dedicated pen 12 can also be linked to the power source of the main system 11 of the terminal, or the control section can automatically start up and run the main system 11 of the terminal when it determines that the dedicated pen 12 with the specific ID code is within the distance d from the main system 11 of the terminal. For this reason, in a case where the dedicated pen 12 is away by the prespecified distance d therefrom or more, the power is automatically cut off to prevent the possibilities of abuse of the device or of mischievous operation thereof by any other unauthorized person from becoming higher.

Embodiment 3 of the present invention is characterized in that there are a plurality of dedicated pens 12 with numbers of 12a to 12d, each of which has different ID code from each other respectively and the main system 11 of the terminal can authorize a plurality of ID codes of the plurality of dedicated pens 12. Although the basic configuration and processing thereof are the same as those in Embodiment 1 as well as in Embodiment 2, Embodiment 3 is characterized in that each value of the authorization flag 44, the accommodation flag 43, and the timer authorization flag 45 is not a binary value but a multiple value, respectively.

Figure 9A:
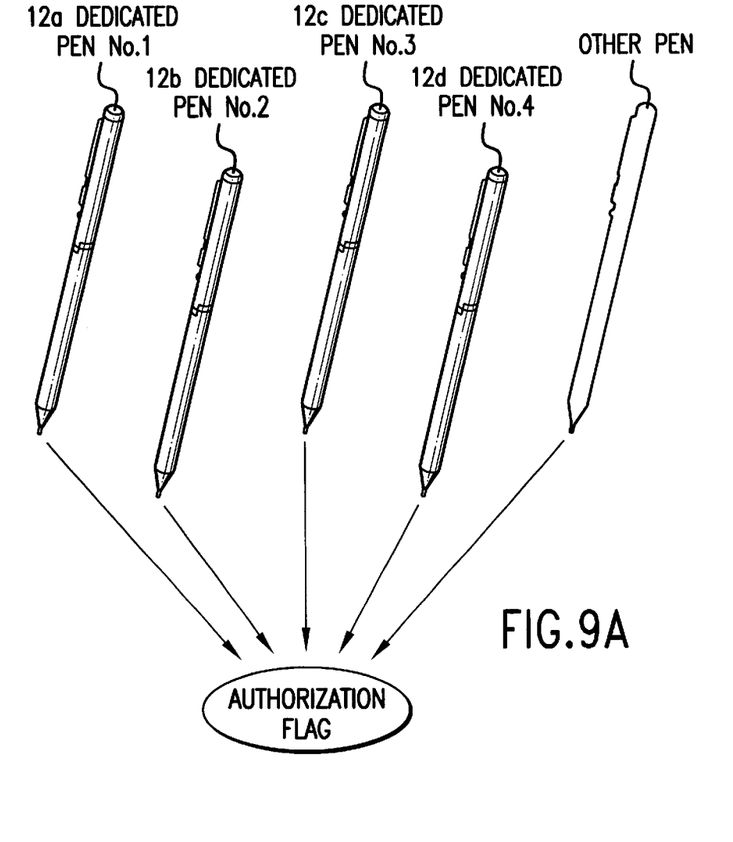
FIGS. 9A and 9B are explanatory views showing a method of setting an authorization flag in a pen-inputted personal information terminal device according to Embodiment 3 of the present invention.
Figure 9B:
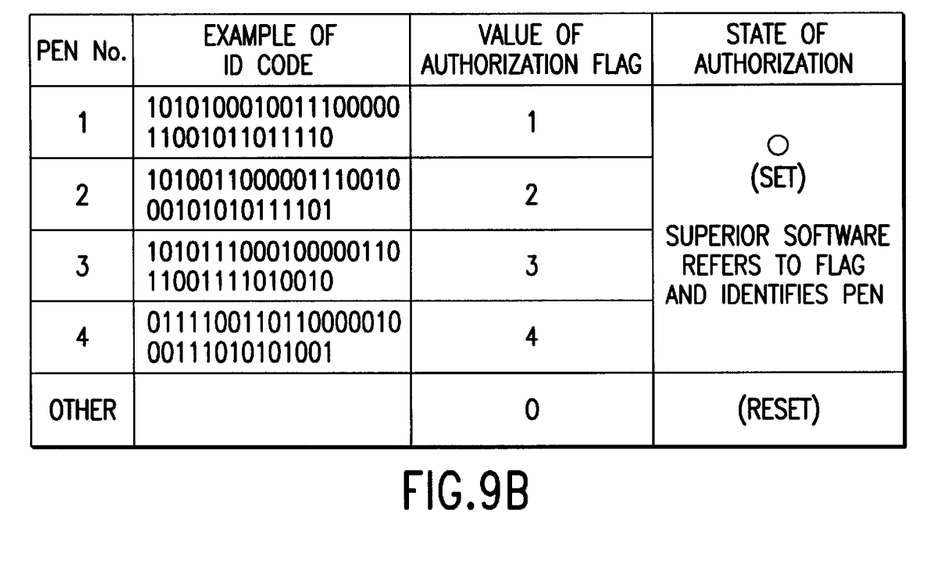

FIGS. 9A and 9B show a method of setting ID code in each of the plurality of dedicated pens respectively according to this embodiment 3. In Embodiment 3, as shown in FIG. 9A, to enable use of pens each having a different ID code, for instance, of No. 1 to No. 4 respectively as dedicated pens 12a to 12d, a value of each authorization flag can be set to any of "4", "3", "2", "1", "0" as shown in FIG. 9B.

More particularly, shown in FIG. 9B, an authorization flag "1" is allocated to the ID code of a dedicated pen 12a with pen No. 1, an authorization flag "2" to the ID code of a dedicated pen 12b with pen No. 2, an authorization flag "3" to the ID code of a dedicated pen 12c with pen No. 3, and an authorization flag "4" to the ID code of a dedicated pen 12d with pen No. 4, and an authorization flag "0" indicating any ID code which can not be authorized, namely which is in the reset state is allocated to a ID code of a pen other than those described above, or in a case where any ID code can not be detected. For this reason, in a case where the flag is any of "1" to "4" other than "0", it can be determined that any of the ID codes can be authorized in the state where the authorization flag is set, namely in the state where input of various instructions of processing from the tablet 13 is authorized and the data can be transferred to the superior software program 40.

It should be noted that the example of the ID code for each of the pens with no. 1 to no. 4 shown in FIG. 9B uses a PN series of degree 5 (pseudo-random number). The ID code in this example can be used in a case where at least four types of ID code should be required, but a PN series of some words with a small cross-correlation value will preferably be used taking into consideration the safety and identifiability.

For this reason, different from Embodiment 1 and Embodiment 2, in a case where an authorization flag provided by the tablet handler program 48 or the like is any of "1" to "4" and not "0", all the coordinate data inputted from the tablet 13 are transferred to the superior software program 40, so that the superior software program 40 can refer to the authorization flag, and such controls as to restrict operation of each pen or the like can be provided according to the value obtained as described above. It is needless to say that an authorization flag becomes "0" if none of the dedicated pens 12a to 12d can be authorized, and then the inputted coordinate data will not be transferred to the superior software program 40.

It should be noted that the ID code receiving section 31 has the possibility that, in a case where the dedicated pens 12a to 12d with the plurality of ID code respectively are close to the main system 11 of the terminal, if an ID code transmission/receiving frequency of any of the pens is identical to that of the other pen, it may be affected due to interference because of an identical channel, but unless these dedicated pens 12a to 12d are so close in use to each other that the channel interference effect occurs, ID code of the pen present closest to the main system 11 of the terminal or of the pen actually operated is received and authorized. Also, if a series with high orthogonality is used for ID codes, the identifiability will be improved.

Accordingly, with Embodiment 3, a plurality of pens can be authorized as dedicated pens for information terminal, which makes it possible to realize, in a case where a plurality of users use one unit of information terminal, the sharing of high-security communications as well as information with the users without any prevention of a free session thereto.

This application is based on Japanese patent application No. HEI 9-9527 filed in the Japanese Patent Office on Jan. 22, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A pen-inputted personal information terminal device for inputting various instructions for processing to a main system of said device by contacting a touch-sensitive tablet on said main system with a touch input instrument comprising:

a dedicated pen having a memory storing a preset ID code, and a circuit for sending said preset ID code to said main system;

a memory in said main system for previously storing therein an ID code of said dedicated pen;

a receiver in said main system for receiving the ID code sent from said dedicated pen; and a pen-input authorizer in said main system for authorizing input of the various instructions for processing to said main system by touching said tablet with said touch input instrument or with the pen, only when the ID code received by said receiver matches the ID code of said dedicated pen stored in said memory of said main system;

wherein the main system further comprises a pen accommodating section for accommodating therein a pen;

said receiver attempts to receive an ID code of a pen from the pen when the pen is accommodated in said pen accommodating section, and when it is determined that the pen is a dedicated pen, receives the ID code transmitted from said dedicated pen; and said pen-input authorizer makes a determination, when the pen has been accommodated in said pen accommodating section, as to whether said receiver can receive an ID code from the pen or not, further makes a determination, when said receiver can receive the ID code from the pen, as to whether the received ID code matches the ID code of said dedicated pen stored in said memory or not, and authorizes input of various instructions for processing by touching said tablet with the pen when said received ID code matches the ID code of said dedicated pen stored in said memory.

2. A pen-inputted personal information terminal device according to claim 1, wherein a plurality of dedicated pens are provided and different ID codes are set thereto respectively;

said memory previously stores therein the ID codes of said plurality of dedicated pens; and said pen-input authorizer authorizes input of various instructions for processing by touching said tablet with the pen when the ID code received by said receiver matches one of the ID codes of said plurality of dedicated pens stored in said memory.

3. A pen-inputted personal information terminal device according to claim 1, wherein said pen-input authorizer makes determination at prespecified time intervals as to whether or not said receiver can receive an ID code from the pen, further makes determination, when said receiver could receive the ID code from the pen, as to whether or not the received ID code matches the ID code of said dedicated pen stored in said memory, and authorizes input of various instructions for processing by touching said tablet when said received ID code matches the ID code of said dedicated pen stored in said memory.

4. A pen-inputted personal information terminal device according to claim 3, wherein a plurality of dedicated pens are provided and different ID codes are set thereto respectively;

said memory previously stores therein the ID codes of said plurality of dedicated pens; and said pen-input authorizer authorizes input of various instructions for processing by touching said tablet with the pen when the ID code received by said receiver matches one of the ID codes of said plurality of dedicated pens stored in said memory.

5. A pen-inputted personal information terminal device according to claim 1; wherein said pen-input authorizer makes determination, when any of various instructions for processing is inputted by touching said tablet with the pen, as to whether the input is carried out with operation of pen-down or of pen-drag, makes determination, when it is determined that the input is performed with the pen-down, as to whether or not said receiver can receive an ID code from the pen, further makes determination, when said receiver could receive the ID code from the pen, as to whether or not the received ID code matches the ID code of said dedicated pen stored in said memory, and authorizes input of various instructions for processing by touching said tablet with the pen when said received ID code matches the ID code of said dedicated pen stored in said memory.

6. A pen-inputted personal information terminal device according to claim 5; wherein a plurality of dedicated pens are provided and different ID codes are set thereto respectively;

said memory previously stores therein the ID codes of said plurality of dedicated pens; and said pen-input authorizer authorizes input of various instructions for processing by touching said tablet with the pen when the ID code received by said receiver matches one of the ID codes of said plurality of dedicated pens stored in said memory.

7. A pen-inputted personal information terminal device according to claim 5, wherein said pen-input authorizer makes determination at prespecified time intervals as to whether or not said receiver can receive an ID code from the pen, further makes determination, when said receiver could receive the ID code from the pen, as to whether or not the received ID code matches the ID code of said dedicated pen stored in said memory, and authorizes input of various instructions for processing by touching said tablet when said received ID code matches the ID code of said dedicated pen stored in said memory.

8. A pen-inputted personal information terminal device according to claim 7; wherein a plurality of dedicated pens are provided and different ID codes are set thereto respectively;

said memory previously stores therein the ID codes of said plurality of dedicated pens; and said pen-input authorizer authorizes input of various instructions for processing by touching said tablet with the pen when the ID code received by said receiver matches one of the ID codes of said plurality of dedicated pens stored in said memory.

* * * * *